(12) United States Patent
Rhodes

(10) Patent No.: US 10,055,506 B2
(45) Date of Patent: Aug. 21, 2018

(54) SYSTEM AND METHOD FOR ENHANCED ACCURACY CARDINALITY ESTIMATION

(71) Applicant: Yahoo! Inc., Sunnyvale, CA (US)

(72) Inventor: Lee Rhodes, Los Altos, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 707 days.

(21) Appl. No.: 14/218,818

(22) Filed: Mar. 18, 2014

(65) Prior Publication Data

US 2015/0269178 A1 Sep. 24, 2015

(51) Int. Cl.
*G06F 17/30* (2006.01)

(52) U.S. Cl.
CPC .................. *G06F 17/3089* (2013.01)

(58) Field of Classification Search
None
See application file for complete search history.

(56) References Cited

U.S. PATENT DOCUMENTS

| | | |
|---|---|---|
| 6,493,703 B1 | 12/2002 | Knight et al. |
| 6,629,097 B1 | 9/2003 | Keith |
| 8,266,126 B2 | 9/2012 | Labuda et al. |
| 8,484,212 B2 | 7/2013 | Liu et al. |
| 2003/0028330 A1 | 2/2003 | Cheng et al. |
| 2003/0229617 A1* | 12/2003 | Rjaibi ............... G06F 17/30469 707/1 |
| 2004/0030667 A1 | 2/2004 | Xu et al. |
| 2005/0222965 A1* | 10/2005 | Chaudhuri ........ G06F 17/30522 707/1 |
| 2006/0085592 A1 | 4/2006 | Ganguly et al. |
| 2008/0133458 A1* | 6/2008 | Zabback ........... G06F 17/30469 707/2 |
| 2008/0246762 A1 | 10/2008 | Ogata et al. |
| 2009/0303901 A1 | 12/2009 | Duffield et al. |
| 2010/0228731 A1 | 9/2010 | Gollapudi |
| 2010/0268719 A1 | 10/2010 | Cormode et al. |
| 2010/0332494 A1* | 12/2010 | Graefe ............. G06F 17/30979 707/759 |
| 2011/0196964 A1 | 8/2011 | Natarajan et al. |
| 2012/0191714 A1 | 7/2012 | Datar et al. |
| 2012/0254333 A1 | 10/2012 | Chandramouli et al. |

(Continued)

OTHER PUBLICATIONS

U.S. Appl. No. 14/078,301, filed Nov. 12, 2013, Office Action, dated Feb. 14, 2014.

(Continued)

*Primary Examiner* — James Trujillo
*Assistant Examiner* — Cheryl M Shechtman
(74) *Attorney, Agent, or Firm* — Hickman Palermo Becker Bingham LLP

(57) ABSTRACT

Techniques are provided for improving the accuracy of analytics on big data using sketches and fixed-size buckets. In a technique for enhancing a unique count (cardinality) estimate of a large data set, a request for a cardinality estimate for the large data set is received. An initial cardinality estimate is determined using a sketch or a fixed-size bucket. If the initial cardinality estimate is within a range where the initial estimate could be further enhanced, the initial estimate is used for a lookup into a lookup table. Based on retrieved values from the lookup table and the initial estimate, an enhanced cardinality estimate is calculated.

24 Claims, 10 Drawing Sheets

(56) References Cited

U.S. PATENT DOCUMENTS

| | | | |
|---|---|---|---|
| 2013/0166557 A1* | 6/2013 | Fricke | G06F 17/30442 707/737 |
| 2013/0241839 A1 | 9/2013 | Walker et al. | |
| 2014/0032514 A1 | 1/2014 | Li et al. | |
| 2014/0280269 A1 | 9/2014 | Schultz et al. | |
| 2015/0081741 A1 | 3/2015 | Xu | |
| 2015/0186464 A1* | 7/2015 | Seputis | G06F 17/30457 707/718 |
| 2015/0227608 A1 | 8/2015 | Rhodes et al. | |

OTHER PUBLICATIONS

Ziv Bar-Yossel et al., "Counting distinct elements in a data stream", Computer Science Division, Univ of California at Berkeley, pp. 1-10.

Sumit Ganguly et al., "Processing Set Expressions over Continuous Update Streams", SIGMOND, Jun. 9-12, 2003, pp. 1-12.

Philippe Flajolet, "HyperLogLog: the analysis of a near-optinal cardinality estimatin Algorithm", DMTCS proc. AH, 2007, pp.

Philipp B. Gibbons et al, "Estimating Simple Functions on the Union of Data Streams", Nov. 10, 2000, pp. 1-13.

Kevin Beyer et al., "Distinct-Value Synopses for Multiset Operations", Communications of the ACM, vol. 52, Oct. 2009, No. 10, pp. 87-95.

Heule et al., "HyperLogLog in Practice: Algorithmic Engineering of a State of the Art Cardinality Estimation Algorithm", EDBT/ICDT, dated Mar. 2013, 10 pages.

Graham Cormode, "Sketch Techniques for Approximate Query Processing", Now the Essence of Knowledge, pp. 1-67.

Frederic Giroire, "Order Statistics and Estimating Cardinalities of massive Data Sets", Discrete Mathematics & Theoretical Computer Science (subm.), by the authors, 1-rev, 2007, pp. 1-13.

Edo Liberty, "Simple and Deterministic Matrix Sketching", YAHOO! Labs, 8 pages.

Edith Cohen et al., "Leveraging Discarded Samples for Tighter Estimation of Multiple-set Aggregates", AT&T Labs-Research, pp. 253-262.

Aiyou Chen, et al., "A Simple & Efficient Estimatin Method for Stream Expression Cardinalities", Bell Labs, Alcatel-Lucent, pp. 171-182.

U.S. Appl. No. 14/078,301, filed Nov. 12, 2013, Notice of Allowance, dated Jun. 16, 2014.

Korean Patent Office, "Search Report" in application No. PCT/US2013/069739, dated Jul. 29, 2014, 12 pages.

Dobra et al., "Sketch-Based Multi-Query Processing Over Data Streams", Conference on Extending Database Technology, dated Mar. 2004, pp. 551-568.

Dimitropoulos et al., "The Eternal Sunshine of the Sketch Data Structure" Computer Networks, vol. 52, Issue 17, pp. 3248-3257, dated Dec. 2008.

Cormode Graham, "An Improved Data Stream Summary: the count-min sketch and its applications", Journal of Algorithms, vol. 55, Issue 1, pp. 58-75, dated Apr. 2005.

Cormode et al., "Methods for Finding Frequent Items in Data Streams" Special Issue Paper, The VLDB Journal, dated 2010, 18 pages.

Claims in Korean application No. PCT/US2013/069739, dated Jul. 2014, 5 pages.

U.S. Appl. No. 14/448,487, filed Jul. 31, 2014, Notice of Allowance, dated Jan. 29, 2015.

U.S. Appl. No. 14/692,477, filed Apr. 21, 2015, Notice of Allowance, dated Jun. 4, 2015.

\* cited by examiner

SYSTEM AND METHOD FOR ENHANCED ACCURACY CARDINALITY ESTIMATION

CROSS-REFERENCE TO RELATED APPLICATIONS

This application references application Ser. No. 14/078,301, filed Nov. 12, 2013, the entire contents of which is hereby incorporated by reference as if fully set forth herein.

FIELD OF THE DISCLOSURE

The present disclosure relates to statistical analysis of large data sets and, more specifically, to computing an enhanced accuracy estimate for a number of unique values, in large data sets.

BACKGROUND

Methods and systems designed for analyzing relatively small data sets begin to break or become non-functional as the size of the date sets increase. The analysis of larger amounts of data (colloquially called "big data") using may require extensive computing resources, including processors and memory. Such methods may require data to be loaded into locally accessible memory, such as system memory or memory cache, where it can be processed to obtain results. However, as the amount of data increases, processing the entirety of the big data in locally accessible memory can become impossible. In such situations, there is a need for generating results for complete analysis of the big data that do not require as much computational cost and latency. To achieve such an outcome, the accuracy of the results may be traded for less computational resources, such as memory.

Big data analysis presents a significant problem, in particular, for large website operators, such as Yahoo! Inc. A large website operator may generate terabytes of data per day describing the traffic to its website, or the content and advertisements displayed. While this vast pipeline of data can be mined for insights into the characteristics and behavior of its users, those insights are simply not available unless the pipeline of data can be analyzed, thereby permitting questions to be asked and answered within a relatively short period of time. For example, if the answer to a question about how many users visited a given website today takes until tomorrow to answer, then the answer may be of little use. Providing faster and more accurate answers to questions such as the unique number of visitors to a given website, or the number of clicks on a given item of content or advertisement, are technical problems of the utmost importance to website operators.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings of certain embodiments in which like reference numerals refer to corresponding parts throughout the figures.

DETAILED DESCRIPTION

Figure 1A:
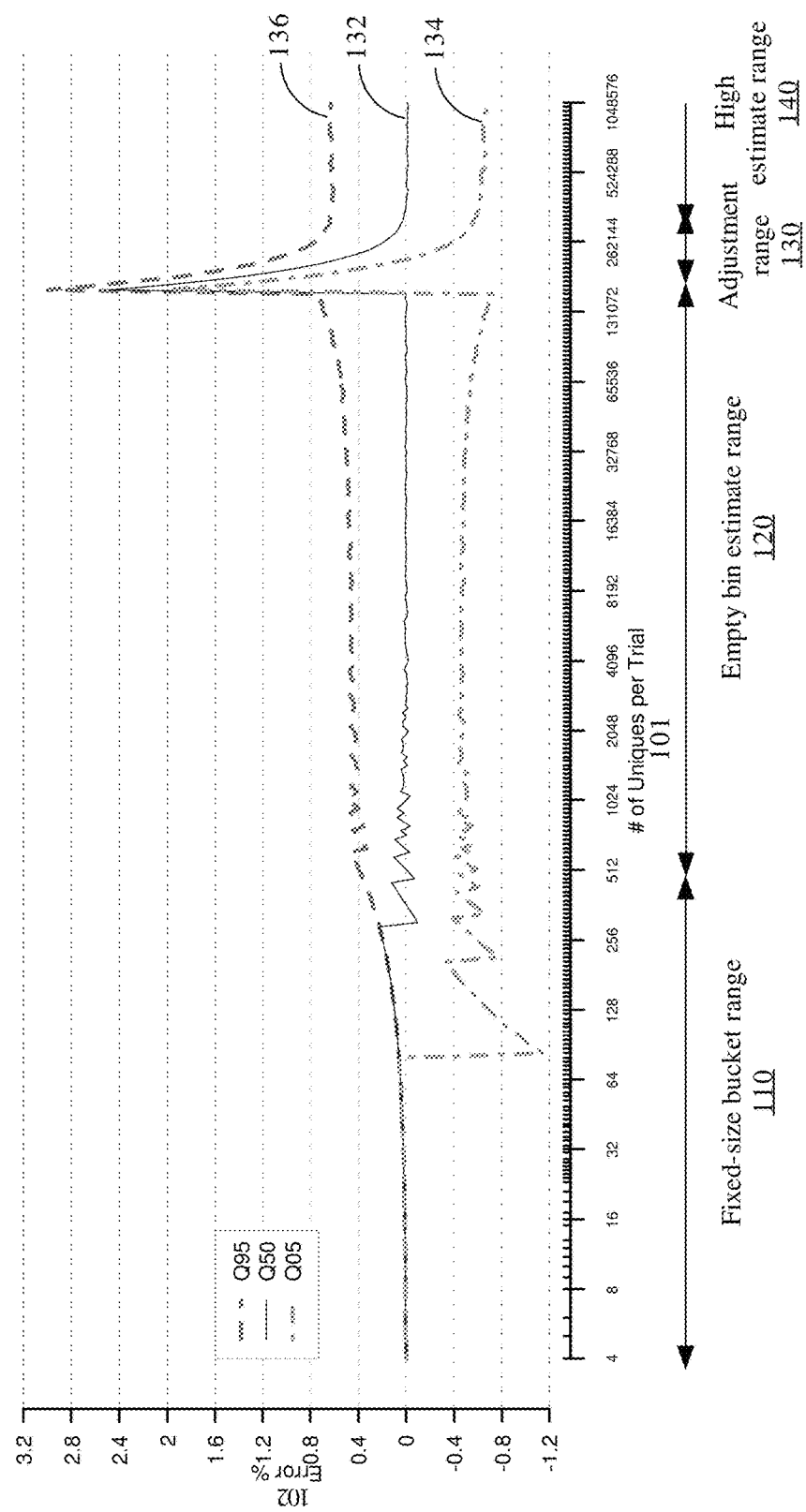
FIG. 1A is a chart that depicts graphs representing the Relative Error Distribution (RED) for initial cardinality estimation within different ranges of cardinalities in different percentiles of the distribution.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Analyzing big data can be an extremely computationally-intensive task with results obtained with significant latency. Sketching techniques can significantly reduce both the computational cost and the latency in obtaining results for the big data. Sketching techniques involve transforming big data into a mini data set, or sample set, that is representative of big data's particular aspects (or attributes). The sample set is used, in various embodiments, to obtain a particular data analysis result estimation, such as unique entry counts, within big data. A sample set, in conjunction with associated metadata in some embodiments, are referred to herein as a sketch data structure or "sketch".

Sketches are useful, for example, for estimating the cardinality of unique values for big data. This is because sketches can be order insensitive, duplicate insensitive, and have well-defined and configurable bounds of size and error distribution. The order insensitive property means that the input data stream from big data can be processed as is; no ordering of the incoming data is required. The duplicate insensitive property means that all duplicates in the input stream will be ignored, which is important in estimating cardinality. The importance of having a bounded size is that one can plan for a maximum memory or disk storage capacity independent of how large the input data stream from the big data becomes. With a bounded, well-defined, and queryable error distribution, it is possible to report to the user not only any estimated result but the upper and lower bounds of that estimate, based on a confidence interval, as well.

Error distribution for estimating cardinality of a large data set may vary based on the actual cardinality of the large data set and techniques used for estimation. For example, one technique may produce an accurate cardinality estimate for low cardinality counts, such as large data sets that contain less 512 unique values. However, the same technique may produce unacceptable average error, error rate, for a large data set with 10's of thousands of unique values. Furthermore, even when a technique produces an acceptable error rate for a cardinality range, the technique may yield an unacceptable relative standard error, error variation, in the cardinality range. For example, the technique that produced estimation for large data sets of less than 512 unique values with relatively low error rate, may produce a relatively high error variation, for cardinality estimation of more than 256 unique values large data sets. Thus, an accurate cardinality range coverage of a technique may be further reduced to a range where both the error rate as well as error variation are acceptable, less than 256 unique values in this example.

In an embodiment, to produce an enhanced accuracy cardinality estimation for a large data set, HyperLogLog (HLL) and fixed-size bucket techniques are used in correlation with other techniques for different ranges of cardinality to yield an acceptable error rate and error variation.

For very low cardinality counts, storing and counting all unique values from the large data set may suffice. A fixed-size bucket may be used for storing the unique values, where the fixed-size bucket may be any memory storage in which a computer system may store data. When all unique values from the large data set are stored in the fixed-size bucket, the count of values in the fixed-size bucket produces a precise cardinality for the large data set. Thus, when a large data set has a low cardinality, the fixed-size bucket technique yields not just an estimate of cardinality but an actual precise cardinality of the large data set. In a related embodiment, a fixed-size bucket may store and count unique values that have been transformed from values in a large data set.

For a larger cardinality large data set, an HLL techniques may be used, in an embodiment. The HLL technique utilizes an FILL sketch that is constructed from the large data set to compute an initial cardinality estimate. HLL sketch itself consists of a bin array: a set of uniquely addressable memory locations that a computer system may store in or retrieve data from, where a particular memory location corresponds to a bin. Depending on a cardinality of a large data set, another technique may be applied to an HLL sketch to yield an initial cardinality estimate for the large data set. When some bins in a bin array of the HLL sketch have not been populated due to low cardinality, an empty bin estimation technique is applied to the HLL sketch to compute a more accurate initial cardinality estimate.

FIG. 1A depicts graphs that represent error variations, such as the Relative Error Distribution (RED) for initial cardinality estimation within different ranges of cardinalities using a HyperLogLog (HLL) sketch. The horizontal X-axis 101 represents the number of unique values, cardinality, in a large data set. The vertical Y-axis, 102, represents the relative error measured as multiples of the Relative Standard Error (RSE) where RSE itself is computed based on the size of the HLL sketch used. Graphs 132, 134, 136 are derived from experimentally measured data where each data point is computed from the average of 10,000 trials. Each trial uses a large data set with a pre-defined known cardinality corresponding to one of the points on X-axis 101 and calculates an initial cardinality estimate using a HyperLogLog (HLL) sketch with a bin array of 65,536 bins, RED is then measured by comparing the initial cardinality estimates for the predefined cardinality with the predefined cardinality itself.

Graph 132 represents the $50^{th}$ percentile, the median, of the measure RED of all 10,000 trials of initial cardinality estimates for each of the predefined cardinality points on X-axis 101. Graph 136 represents the $95^{th}$ percentile of the similarly measured RED and graph 134 the $5^{th}$ percentile. As depicted by these graphs, RED for the initial cardinality estimate is highly skewed in fixed bucket range 110, where the upper half of the RED, graph 136, is no longer symmetric with the lower half of the RED, graph 134. Furthermore, RED slopes up sharply and only returns to lower ranges in high estimate range 140.

Figure 1B:
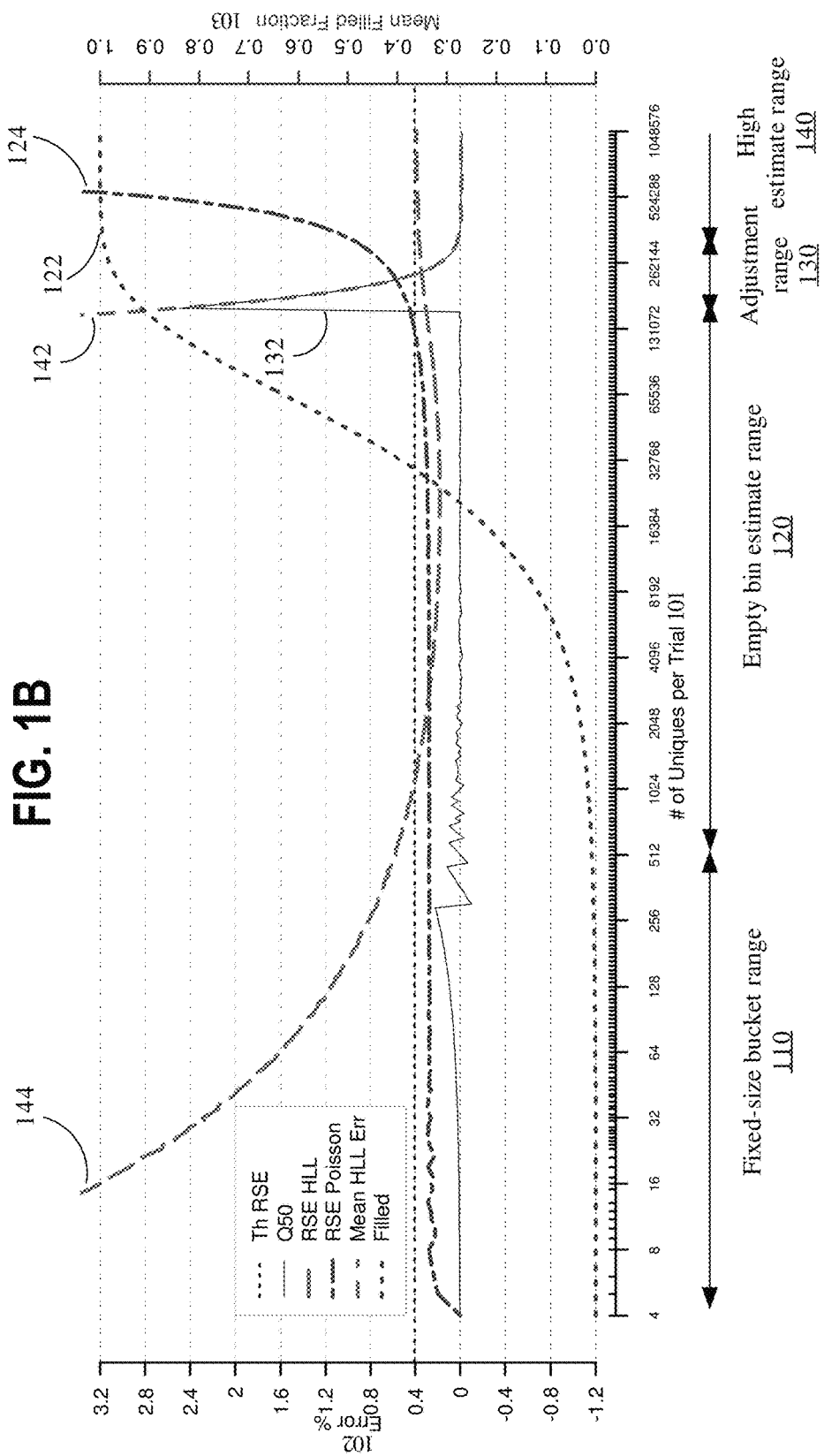
FIG. 1B is a chart that depicts graphs representing error variations such as the Relative Error Distribution (RED), for various techniques for initial cardinality estimation within different ranges of cardinalities.

FIG. 1B depicts graphs that represent error variations such as the Relative Error Distribution (RED), for various techniques for initial cardinality estimation within different ranges. Graphs 124, 142, 144 are generated similar to the experimental techniques discussed above for FIG. 1A where 10,000 trials are conducted using a HyperLogLog (HLL) sketch with a bin array of 65,536 bins to calculate initial cardinality estimates and measure each point on the graphs. Graphs 144 and 142 are generated using a full bin technique of HLL and represent an average Relative Standard Error (RSE) and a mean error of the measured RED, respectively. Graph 124 is generated using an empty bin technique of HLL and represents the average Relative Standard Error (RSE).

As graphs 142 and 144 illustrate, the HLL full bin technique yields greater error rate and error variation in ranges 110, 120 and 130. As graph 124 indicates, the empty bin estimate technique produces a low error rate and error variation for an initial cardinality estimate in empty bin estimate range 120 but, as graph 134 in FIG. 1A represents, a highly skewed RED in fixed bucket range 110. Furthermore, the empty bin HLL technique also yields greater error in adjustment range 130 and high estimate range 140, as illustrated by graph 124 sloping up in FIG. 1B.

Another HLL enhancement technique involves employing a table lookup and regression between empty bin estimate range 120 and high estimate range 140, in an embodiment. In adjustment range 130, an initial cardinality estimate is used as a lookup value into a lookup table. The lookup table may be any memory storage that a computer system may store in or retrieve data from. The lookup table may contain a set of lookup values and a set of mapped values, where one or more lookup values correspond to one or more mapped values. In an embodiment, the lookup table may not actually store the mapped values but rather derive them from an index of each stored lookup value. In a related embodiment, the lookup values or the mapped values may be exponentially or logarithmically related to each other. In such an embodiment, the lookup table may be referred to as a logarithmic lookup table. In a related embodiment, the lookup values or the mapped values may be based on a lookup table where the spacing of the values of adjustment range 130 are such that the ratio of adjacent values in the table are a constant (such as Enhanced Values in Table 1).

In an embodiment, in order to enhance the accuracy of an initial cardinality estimate in adjustment range 130, the initial cardinality is used as a lookup value for the lookup table to retrieve mapped values from the lookup table. Based on the mapped values and the initial cardinality estimate, an enhanced accuracy cardinality estimate may be calculated.

In a very low range cardinality estimation, fixed-size bucket range 110, a fixed-size bucket technique may be used to identify a precise cardinality for a large data set, in an embodiment.

Thus, as a cardinality for a large data set increases from fixed-size bucket range 110 to high estimate range 140, different cardinality estimation techniques are applied to enhance the accuracy of a cardinality estimate.

Figure 1C:
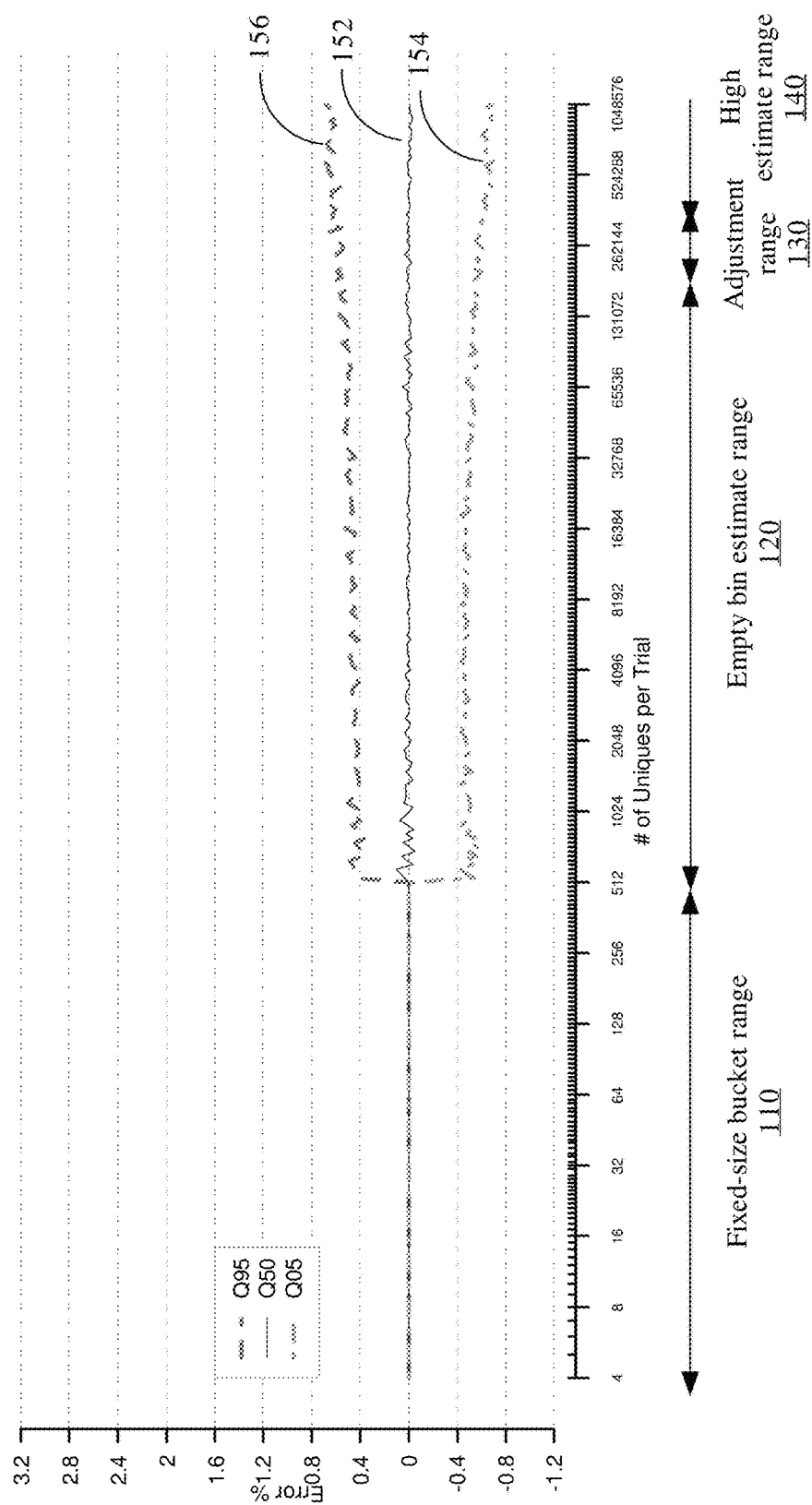
FIG. 1C is a chart that depicts graphs representing error variations, such as the Relative Error Distribution (RED) for enhanced cardinality estimation within different ranges of cardinalities, in an embodiment.

FIG. 1C depicts graphs that represent error variations, such as the Relative Error Distribution (RED) for enhanced cardinality estimation within different ranges of cardinalities using a HyperLogLog (HLL) sketch, in an embodiment. Graphs 152, 154, 156 are generated similar to the experimental techniques discussed above for FIG. 1A where 10,000 trials are conducted using a HyperLogLog (HLL) sketch with a bin array of 65,536 bins to calculate enhanced cardinality estimates and measure each point on the graphs. Graph 152 represents the $50^{th}$ percentile, the median, of the measured RED of all 10,000 trials of initial cardinality estimates. Graph 156 represents the $95^{th}$ percentile of the similarly measured RED and graph 154 the $5^{th}$ percentile. As depicted by these graphs, compared with FIG. 1A, RED for the enhanced cardinality estimate is no longer highly skewed in fixed bucket range 110 and stays flat in empty bin estimate range 120, adjustment range 130 and high estimate range 140.

Cardinality Estimation System

Figure 2:
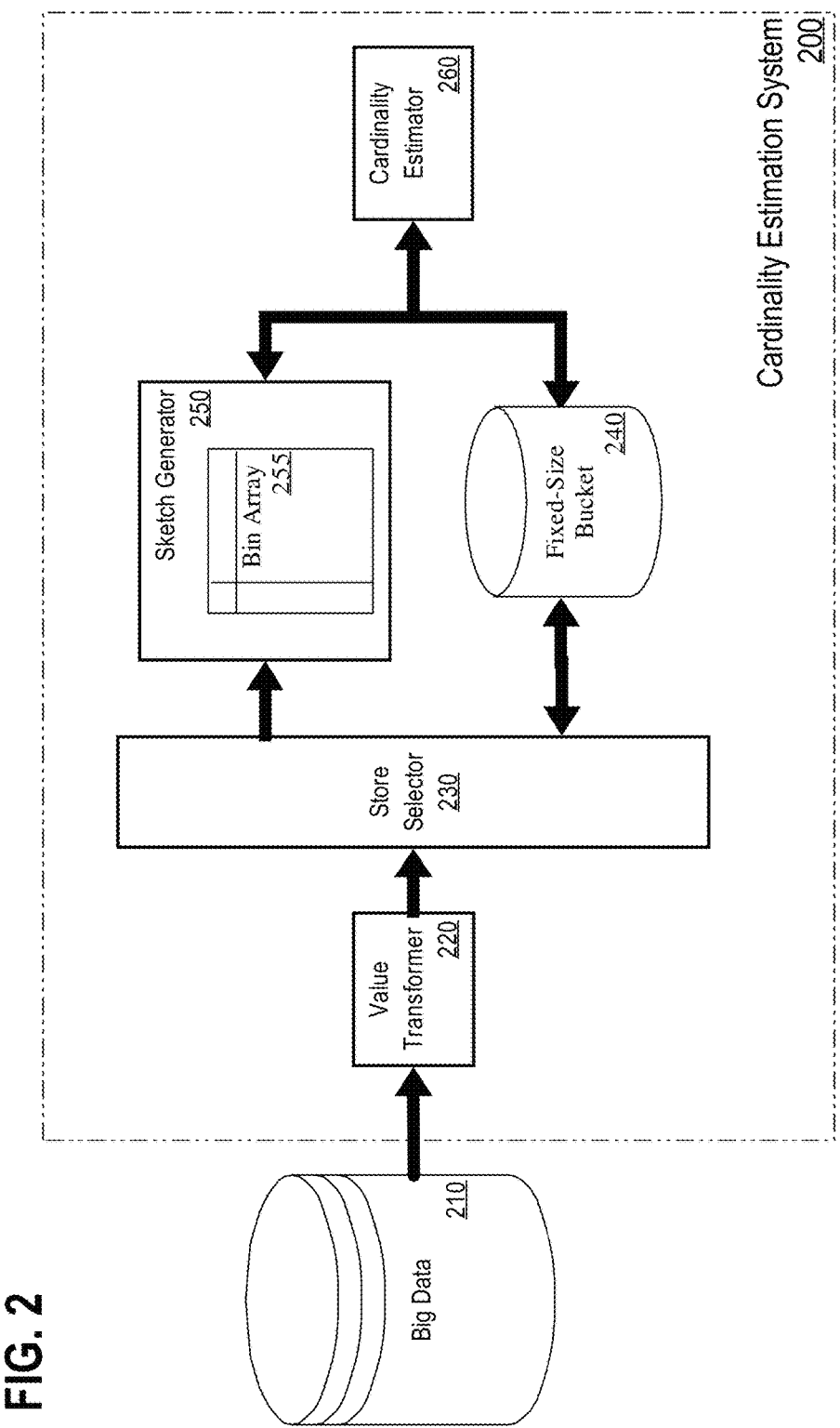
FIG. 2 is a block diagram that depicts a cardinality estimation system that estimates a cardinality of a large data set, in an embodiment.

FIG. 2 is a block diagram that depicts a Cardinality Estimation. System 200 for estimating cardinality of a large data set, in an embodiment. Cardinality Estimation System 200 may be used for transforming values of large data sets from big data, storing transformed values, generating sketches, and estimating cardinalities of large data sets. In an embodiment, a data stream is generated from Big Data 210 and fed into Cardinality Estimation System 200. Value Transformer 220, a component of Cardinality Estimation System 200, receives the data stream from Big Data 210. Value Transformer 220 transforms the data stream into a set of transformed values based on which sketches can be generated.

Value Transformer 220 transforms the data stream into a substantially uniform, random distribution of transformed values. Due to this property, the transformed set may be analyzed to yield a desired estimation of cardinality. In an embodiment, Value Transformer 220 may include a hash function that produces the same hash value for each instance of a data value from the data stream. In some instances, a hash function may generate the same hash value based on two or more unique input data values. Such an occurrence when two different data values are transformed into the same hash value is referred to as a "hash collision." But taking into consideration the kind of data in the data stream, the choice of hash algorithm may be made to reduce or avoid hash collisions.

Store Selector 230 may receive transformed values and determine whether to store the transformed values in Fixed-Size Bucket 240 or forward the transformed values on to Sketch Generator 250, also a component of Cardinality Estimation System 200. Store Selector 230 may only store unique transformed values into a Fixed-Size Bucket 240. Store Selector 230 may also retrieve transformed values from Fixed-Size Bucket 240 and redirect those values to Sketch Generator 250 to generate a sketch out of the stored transformed values. In an embodiment, neither Store Selector 230 nor Fixed-Size Bucket 240 may be present or part of Cardinality Estimation System 200. In such embodiment, Sketch Generator 250 receives the transformed values directly from Value Transformer 220.

Sketch Generator 250 receives transformed values and based, on the transformed values, generates a sketch. In an embodiment, such a sketch includes Bin Array 255.

Cardinality Estimator 260, another component of Cardinality Estimation System 200, calculates an enhanced accuracy cardinality for a large data set based on a Fixed-Size Bucket 240 or a generated sketch, such as Bin Array 255 in the related embodiment.

Each of Value Transformer 220, Store Selector 230, Sketch Generator 250, and Cardinality Estimator 260 may be implemented in software, hardware, or a combination of software and hardware. For example, one or more of Value Transformer 220, Store Selector 230, Sketch Generator 250, and Cardinality Estimator 260 may be implemented using stored program logic.

Fixed-Size Bucket and Bin Array

Transformed values from a large data set may either be stored in a fixed-size bucket (such as Fixed-Sized Bucket 240) or used to generate a sketch. In an embodiment, unique transformed values are initially stored in the fixed-size bucket until the count of stored values in the fixed-size bucket exceeds a threshold. The threshold may be pre-configured for the fixed-size bucket or may be based on the memory space available to the fixed-size bucket or may be automatically computed at run-time. The threshold also corresponds to the upper bound of a fixed-size bucket cardinality range because once the threshold is reached, the fixed-size bucket is not used anymore for a cardinality estimation and may be de-allocated.

While the threshold has not been reached, the count of the transformed values in the fixed-size bucket represents the precise cardinality for the large data set. When the threshold is reached, the transformed values stored in the fixed-size bucket and any subsequent transformed value are processed by a sketch generator (for example, Sketch Generator 250) to generate a sketch for a cardinality estimation of the large data set. In a related embodiment, the memory space occupied by the fixed-size bucket may be then de-allocated to create memory space for sketch generation.

In an embodiment, a sketch generator may be an HLL sketch generator. An HLL sketch generator subdivides a transformed value into two portions. One portion is used to select a particular bin in a bin array and the other portion to determine whether to increment the counter stored in the bin. An embodiment of HLL sketch generation is further described below and depicted in FIG. 4.

Figure 3:
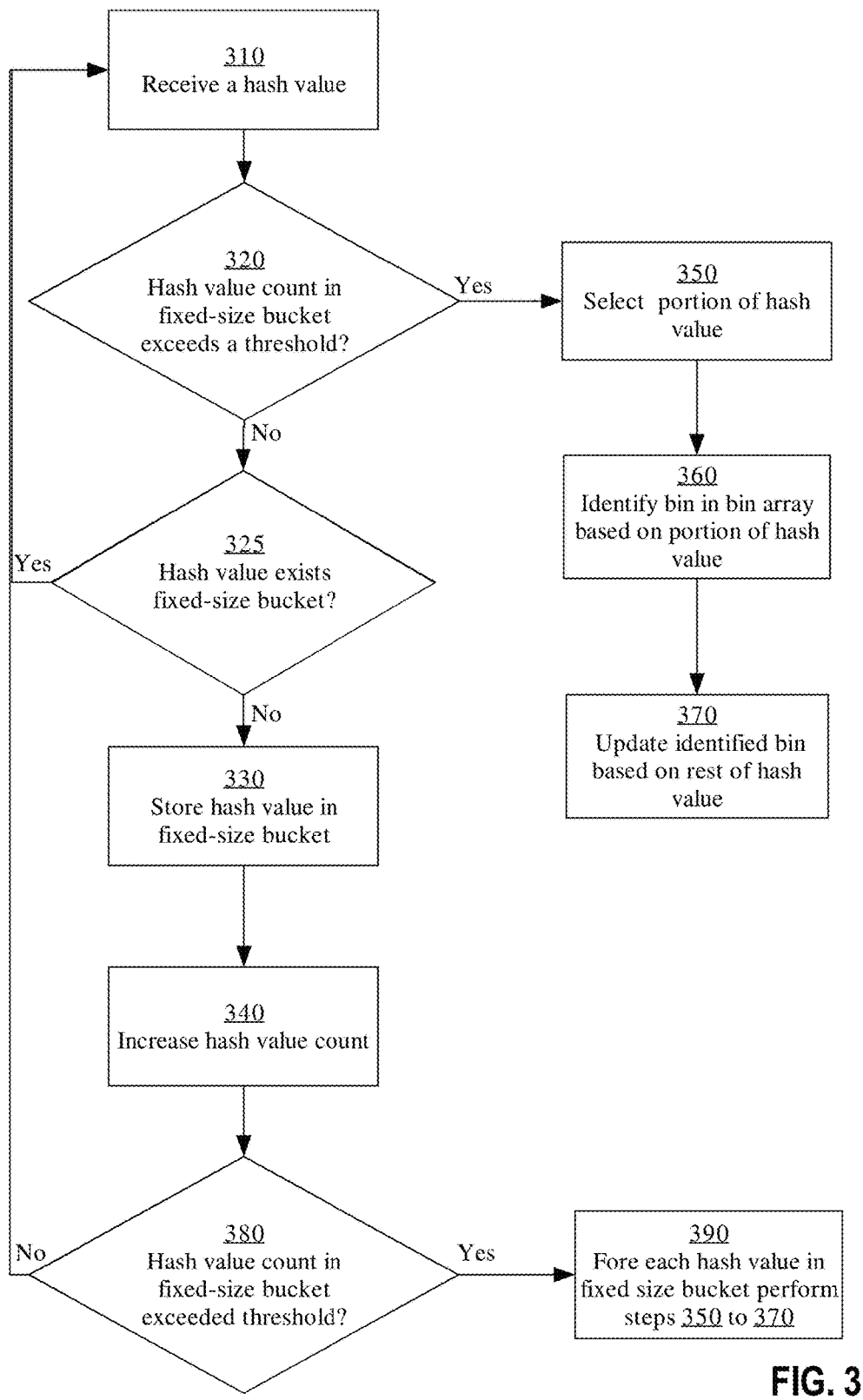
FIG. 3 is a flow diagram that depicts a process for generating a fixed-sized bucket, in an embodiment.

FIG. 3 is a flow diagram that depicts a process 300 for storing transformed values in a fixed-sized bucket. At block 310, a hash value, a transformed value from a large data set, is received. At block 320, it is determined whether a count of hash values in the fixed-size bucket exceeds a threshold. If not, then process 300 proceeds to block 325; otherwise process 300 proceeds to block 350. At block 325, it is determined whether the hash value exists in the fixed-size bucket. If not, then process 300 proceeds to block 330 where the received transformed value is stored in the fixed-size bucket and a count of hash values in the fixed-size bucket increases at block 340. Otherwise, if the hash value already exists in the fixed-size bucket, then process 300 returns to block 310 to receive another hash value. While the count of hash values has not exceeded the threshold, the count of hash values represents the precise cardinality of the large data set.

Once the count of hash values in the fixed-size bucket reaches the threshold, all the hash values within the fixed-size bucket are then used to generate a sketch. At block 380, the count of hash values is evaluated against the threshold again, and if the hash value count exceeds the threshold, then process 300 transitions from block 380 to block 390. All the hash values within the fixed-size bucket, as well as any newly received hash values are then evaluated for sketch generation as indicated in blocks 350 through 370.

Figure 4:
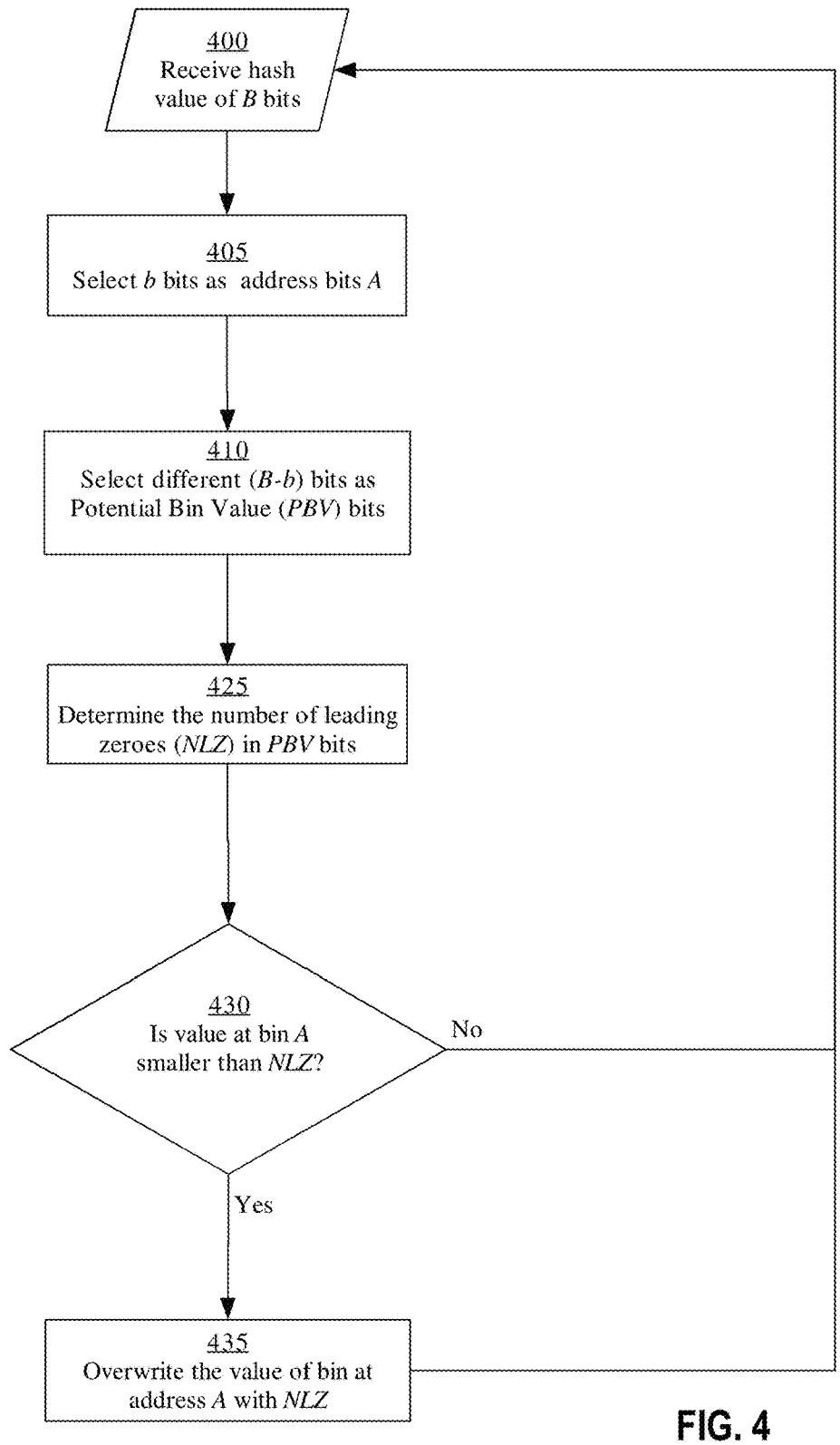
FIG. 4 is a flow diagram that depicts a process for generating an HLL sketch with a bin array, in an embodiment.

At block 350, a received hash value is divided into two portions and a first portion is selected. Based on the first portion, at block 360, a particular bin is identified in a bin array and, based on the other portion of the hash value, the particular bin may be updated at block 370. In a related embodiment, a first portion is selected based on the first leftmost b bits and is used as an address for a bin in a bin array. Thus, in such embodiment, the bin array would contain k number of bins, where k is equal to $2^b$. This embodiment is further described below in the description of HLL sketch generation as illustrated in FIG. 4. However, embodiments are not limited to any particular sketch generation technique. Other sketches such as a fixed-size sketch or theta sketch (described in U.S. application Ser. No. 14/078,301) may be used in conjunction with a fixed-size bucket to yield similar results in a cardinality estimation.

Generating HLL Sketch

FIG. 4 is a flow diagram that depicts a process for generating an HLL sketch with a bin array, in an embodiment. At block 400, a hash value, a transformed value from a large data set, with a size of B bits, is received. At block 405, b hits of the B-bit hash value are selected as address bits, A. In an embodiment, a bin array with a number of bins equal to all possible address bit permutations, $k=2^b$, may be instantiated. Any set of b bits of the B-bit hash may be selected as address bits, A, such as the leftmost b bits of the B-bit hash value, the rightmost b bits, or bits 5 through 5+(b−1). At block 410, the rest of the bits (B−b) are selected as a potential bin value (PBV). The number of leading zeroes (NLZ) in the potential bin value (PBV) is determined at block 425. Alternatively, the position of the leftmost 1-bit (counted from the left) in the remaining (B−b) bits of the hash value is determined and a position value is assigned based on the determined position. For example, if the leftmost bits in the remaining bits of the hash value are 00010101111, then the position value is equal to 4. The number of leading zeros may be then determined by subtracting one from the position value.

At block 430, it is determined whether the value in the particular bin at address A is smaller than the number of leading zeroes, NLZ, of the hash value. Initially, the value in the particular bin is zero. If the value in the particular bin is greater than or equal to NLZ, then the process proceeds to block 400, where the next hash value is processed. Otherwise, at block 435, the particular bin is overwritten with the number of leading zeroes, NLZ, of the hash value, and the next hash value is then processed at block 400. Once all the transformed values from the large data set are processed, the HLL sketch representing the large data set is generated.

Initial Cardinality Estimate Calculation

A sketch, generated from hash values, may produce an initial cardinality estimate. In an embodiment, a cardinality estimator may obtain a cardinality estimate based on an HLL sketch that is generated as described in the section above. An initial cardinality estimate, E, may be obtained from a bin array of the HLL sketch using the following equation:

$$E = \alpha_k k^2 \left( \sum_{j=1}^{k} 2^{-M[j]} \right)^{-1}$$

where k is a number of bins in the bin array, M[j] is the value in bin j and $\alpha_k$ is a constant that has different values based on the number of bins, k. For example, $\alpha_k$ for k=16 is equal to 0.673, for k=32 is 0.697, for k=64 is 0.709, and for k>128, $\alpha_k$ is determined by the following equation: $\alpha_k = 0.7213/(1+1.079/k)$.

The cardinality estimate accuracy of an HLL sketch may be enhanced in low ranges of cardinality. In an embodiment, due to low cardinality of a large data set, hash values generated from the large data set may not have enough variance to be able to populate all k bins of k-size bin array with NLZ values. Thus, an HLL estimate based on the above equation may not be accurate for this low cardinality range (for example, in empty bin estimate range 120). However, the following equation yields a relatively accurate initial estimate, E, for an HLL sketch in empty bin estimate range:

$$E = k \log\left(\frac{k}{V}\right)$$

where k is a number of bins in the bin array and V is a number of empty bins in the bin array.

Enhanced Estimate of Cardinality with Table Lookup

In an embodiment, when a cardinality estimation request is received, an enhanced cardinality may be computed by a cardinality estimator. If a fixed-size bucket exists (has not been de-allocated) and/or a threshold for the fixed-size bucket has not been reached, then the count of hash values in the fixed-size bucket produces the precise cardinality for a large data set from which the hash values were transformed. Otherwise, an initial estimation based on a sketch may be enhanced by a lookup table to yield an enhanced estimate of cardinality for the large data set.

An initial cardinality estimate based on a sketch may be enhanced within a particular range of cardinalities, such as adjustment range, in an embodiment. The adjustment range for a sketch may depend on a configuration or a size of a sketch. The size of a sketch may be configured to be a power of 2 but non-power of 2 size sketches may also be used in other embodiments. In a related embodiment, an HLL sketch adjustment range depends on a number of bins in a bin array, k. In such embodiment, the adjustment range may have lower bound of k and a higher bound of k multiplied by a factor. In a related embodiment, such factor may be $2^{2.5}=5.66$.

Figure 5:
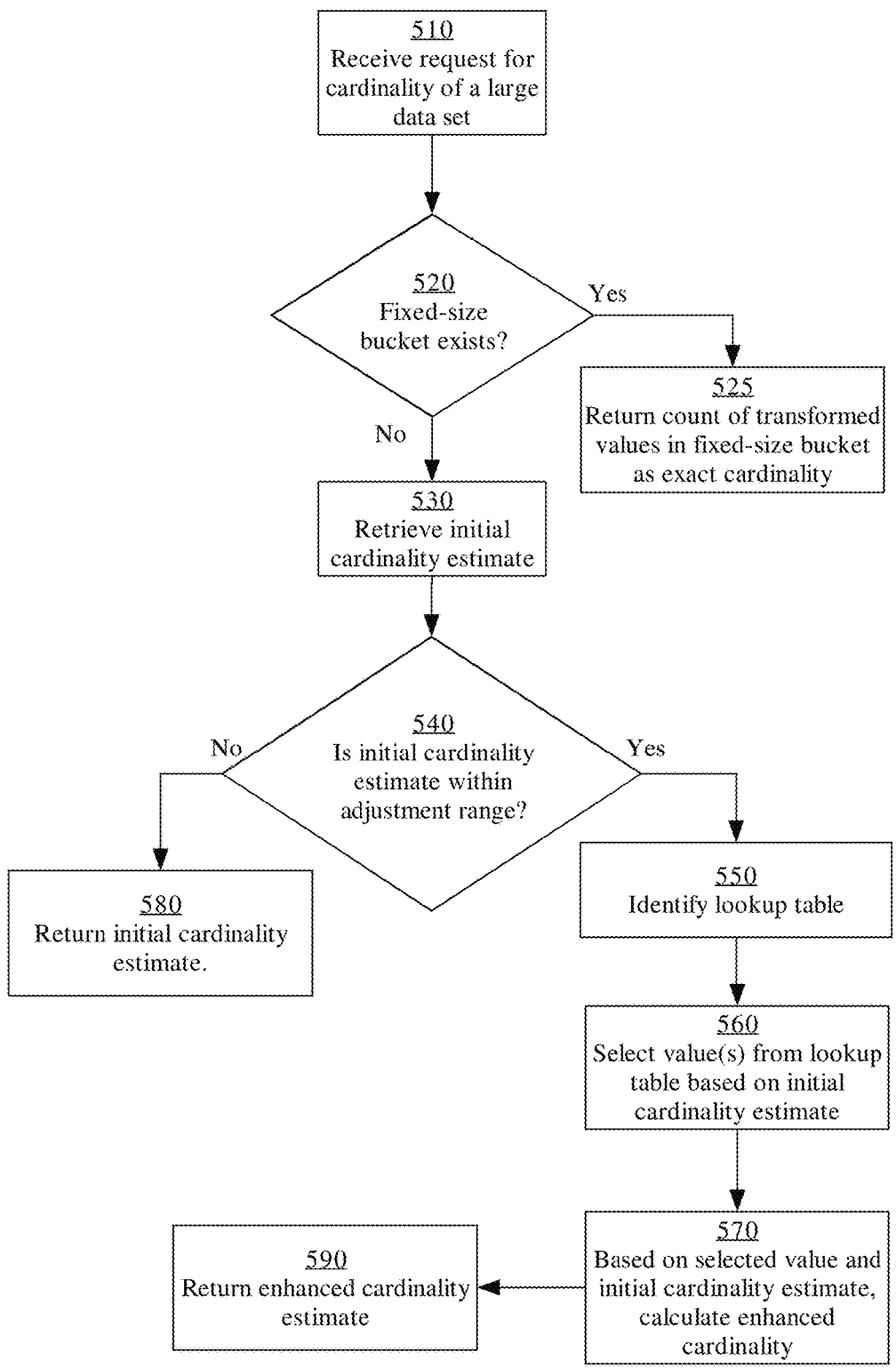
FIG. 5 is a flow diagram that depicts a process for producing an enhanced estimation of cardinality within an adjustment range based on a lookup table, in an embodiment.

FIG. 5 is a flow diagram that depicts a process for producing an enhanced accuracy cardinality estimate within an adjustment range based on a lookup table, in an embodiment. At block 510, a request for cardinality estimation of an already processed large data set is received. If it is determined that a fixed-size bucket exists at block 520 or a threshold for the fixed-size bucket has not been reached, then a count of transformed values within the fixed-size bucket is returned, at block 525, as an precise cardinality of the large data set. Otherwise, at block 530, an initial cardinality estimate based on a sketch representing the large data set is retrieved. If, at block 540, the initial cardinality estimate is outside of the adjustment range, then, at block 580, the initial cardinality estimate is returned as a cardinality estimate for the large data set.

If the initial cardinality estimate is within the adjustment range, as determined at block 540, then a particular lookup table for adjustment is identified at block 550. At block 560, value(s) are selected from the particular lookup table based on the initial cardinality estimate. Based on the selected value(s) and the initial cardinality estimate, an enhanced accuracy cardinality estimate is calculated at block 570 and is returned as an enhanced accuracy cardinality estimate for the large data set at block 590.

In an embodiment, multiple lookup tables may exist for enhancing an accuracy of a cardinality estimate corresponding to different adjustment ranges. A lookup table may exist for a particular configuration or size of a sketch. In a related embodiment, different lookup tables exist for HLL sketches based on different size bin arrays. For example, an HLL sketch with 1,024 bins may have a different lookup table than an HLL sketch with 65,536 bins.

In an embodiment, a lookup table maps an initial cardinality estimate values (hereinafter "initial values") to an enhanced accuracy cardinality estimate values (hereinafter "enhanced values"). The lookup table may contain either initial values or enhanced values or both. In embodiments where only one type of values is stored in a lookup table, each of corresponding mapped values of the other type may be derived from a position of each stored value within the lookup table such as table index. For example, if only initial values are stored in a lookup table, then an enhanced value corresponding to an initial value may be determined by multiplying a table index number for the initial value by a pre-defined static interval value and adding a pre-defined static offset value to the product. For example, if a value is stored at index i of a lookup table, then the mapped value may be derived by k*i+b equation, where k is a static interval value and b is a static offset.

In a related embodiment, cardinality values may be stored in a lookup table based on a logarithmic scale or an exponential scale, such as in a logarithmic lookup table. In such embodiment, either initial values or enhanced values would be exponentially or logarithmically related to each other.

Table 1 below depicts an embodiment of a lookup table with exponentially related values for an HLL sketch that has been configured for $k=2^{16}$ bins.

TABLE 1

| Logarithmic Lookup Table | | |
|---|---|---|
| Initial Value | Enhanced Value | Table Index, i |
| 8.6254201763368330E4 | $2^{0}*2^{16}$ | 0 |
| 8.8310658365836410E4 | $2^{1/16}*2^{16}$ | 1 |
| 9.0490949768946800E4 | $2^{2/16}*2^{16}$ | 2 |
| 9.2791578071435900E4 | $2^{3/16}*2^{16}$ | 3 |
| 9.5229207828917480E4 | $2^{4/16}*2^{16}$ | 4 |
| ... | ... | ... |
| 3.7072760009473265E5 | $2^{40/16}*2^{16}$ | 40 |

Each enhanced value in Table 1 is related to another by the exponent of 1/16 of base 2 or $2^{1/16}$. In related embodiments, values in a look up table may be related by a different exponent of base 2 or different base and exponent values. In a related embodiment, a lookup table as depicted in Table 1 may not need to store enhanced values because the enhanced values may be derived from the table index, i and number of bins in the bin array, k. An enhanced value for an initial value stored at table index i is equal to $2^{k+i/16}$. In another embodiment, enhanced values may be stored in a lookup table, while corresponding initial values may be exponentially related to each other based on the table index.

Figure 6:
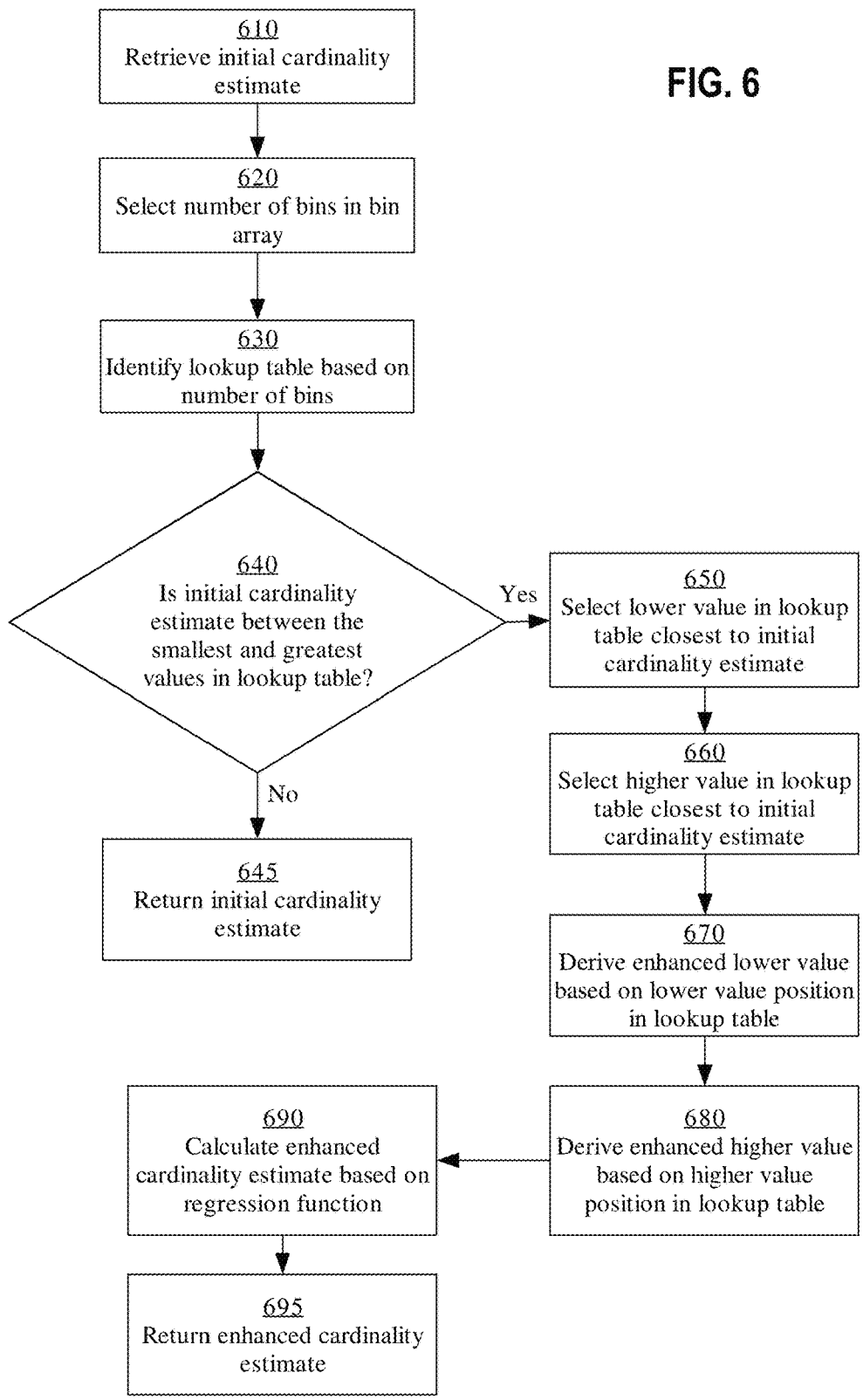
FIG. 6 is a flow diagram that depicts a process for producing an enhanced estimation of cardinality using a lookup table and a regression function, in an embodiment.

FIG. 6 is a flow diagram that depicts a process for producing an enhanced estimation of cardinality using a lookup table, in an embodiment. At block 610, an initial cardinality estimate value, or "initial value," is retrieved. The initial value may be based on a cardinality estimate produced by an HLL sketch as described above. At block 620, a number of bins used in the HLL sketch is determined. Based on the number of bins, an appropriate lookup table is identified at block 630. If the initial value is outside of the lookup table range, as evaluated at block 640, then the cardinality estimate is outside of the corresponding adjustment range. Thus, no further enhancement is necessary, and the initial value is then returned, at block 645.

However, if it is determined at block 640 that the initial value is within the lookup table range, then, at block 650, a lower value is selected, from the lookup table, that is closest in value to the initial value but is less than the initial value. Similarly, at block 660, a higher value is selected from the lookup table that is closest in value to the initial value but is greater than the initial value. Based on an index of the lookup table for the lower value, an enhanced lower value is identified at block 670, and similarly, based on an index of the lookup table for the higher value, an enhanced higher value is identified at block 680. The derivation of the enhanced lower and higher values may be performed similar to process described for Table 1 above. At block 690, a regression technique is used to calculate an enhanced accuracy cardinality estimate value for the initial value based on the initial value, the lower value, and the higher value. The calculated enhanced accuracy cardinality estimate is then returned at block 695.

Figure 7:
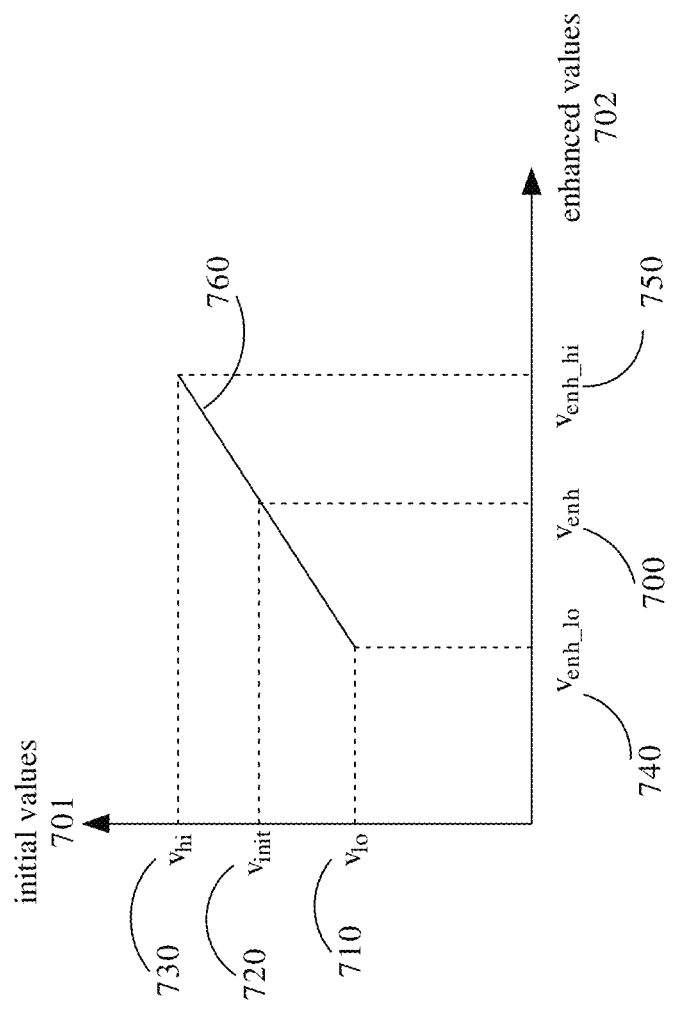
FIG. 7 is a chart that depicts an association between initial values and enhanced values, in an embodiment.

FIG. 7 is a chart indicating use of a linear regression technique to compute an enhanced value based on an initial value, in an embodiment. Using the process depicted in FIG. 6 and described previously, a lower value, $v_{lo}$ 710, and a higher value, $v_{hi}$ 730, are obtained from the lookup table based on an initial value $v_{init}$ 720. Then, an enhanced lower value, $v_{enh\_lo}$ 740, and an enhanced higher value, $v_{enh\_hi}$ 750, are derived from the corresponding indexes of the lookup table. Line 760 depicts a line between a point with coordinates ($v_{enh\_lo}$ 740, $v_{lo}$ 710) and a point with coordinates ($v_{enh\_hi}$ 750, $v_{hi}$ 730), where $v_{lo}$ 710, $v_{init}$ 720 and $v_{hi}$ 730 are on initial values 701 axis and $v_{enh\_lo}$ 740, $v_{enh}$ 700 and $v_{enh\_hi}$ 750 are on enhanced values 702 axis. The $v_{enh}$ 700 value is the coordinate for enhanced values 702 axis on line 760 that corresponds to $v_{init}$ 720 coordinate on the line. Thus, $v_{enh}$ 700 may be obtained using the following equation:

$$v_{enh}=v_{enh\_lo}(v_{init}-v_{lo})*(v_{enh\_hi}-v_{enh\_lo})/(v_{hi}-v_{lo})$$

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
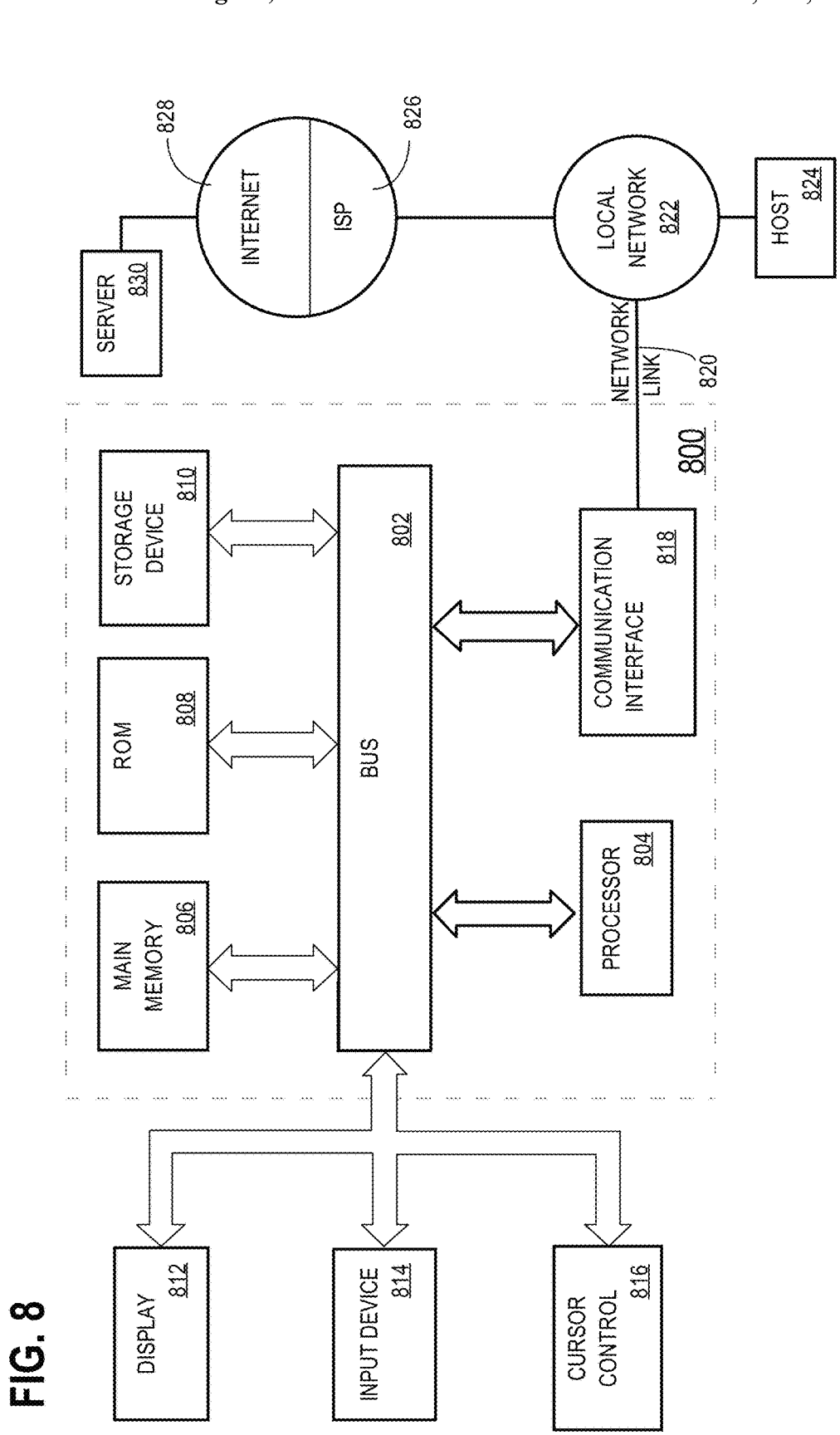
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a request for a number of unique values within a data set;
   calculating a first estimated cardinality of unique values in the data set by evaluating one or more values in the data set;
   determining whether the first estimated cardinality is within a particular range;
   if it is determined that the first estimated cardinality is within the particular range, then:
   using the first estimated cardinality as a lookup value into a plurality of mapped values corresponding to the particular range, identifying, from the plurality of mapped values, a first mapped value that corresponds to the first estimated cardinality, and
   based on the first mapped value and the first estimated cardinality, calculating a second estimated cardinality of unique values in the data set; and
   identifying the second estimated cardinality as a response to the request for the number of unique values in the data set without having to determine the exact number of unique values in the data set;
   wherein the method is performed by one or more computing devices.

2. The method of claim 1, wherein calculating the second estimated cardinality is based on the first mapped value, the first estimated cardinality, and a second mapped value from the plurality of mapped values, wherein the first mapped value is less than the first estimated cardinality and the second mapped value is greater than the first estimated cardinality.

3. The method of claim 2, wherein each value in the plurality of mapped values corresponds to an exponential value in a plurality of exponentially related values.

4. The method of claim 3, wherein:
   calculating the second estimated cardinality is based on the first mapped value, the second mapped value, the first estimated cardinality, a first exponential value, and a second exponential value;
   the first exponential value is from the plurality of exponentially related values and corresponds to the first mapped value, and
   the second exponential value is from the plurality of exponentially related values and corresponds to the second mapped value.

5. The method of claim 4, wherein calculating the second estimated cardinality is based on a linear regression.

6. The method of claim 1, wherein the particular range corresponds to a number of memory locations in a plurality of memory locations.

7. The method of claim 6, further comprising, prior to calculating the first estimated cardinality:
   receiving a hash value;
   determining a hash value count that indicates a number of unique hash values that have been generated based on a subset of the data set; and
   if it is determined that the hash value count is below a threshold and the hash value does not exist in a set of unique hash values, then adding the hash value to the set of unique hash values.

8. The method of claim 7, further comprising:
   if it is determined that the hash value count exceeds the threshold, then, for each hash value of the set of unique hash values:
   identifying, based on a first portion of said each hash value, a particular memory location among the plurality of memory locations, each of which stores a particular count, and
   based on a second portion of said each hash value, determining whether to increase the particular count at the particular memory location.

9. The method of claim 8, wherein the first estimated cardinality is based on each particular count stored in the plurality of memory locations.

10. A method comprising:
    receiving a data stream of values from a data set to estimate a cardinality of unique values in the data set;
    transforming a first value from the data stream of values to a first hash value;
    determining a current cardinality of unique values for values received from the data set by determining a hash value count for a set of unique hash values generated by transforming data set values from the data stream to hash values;
    if it is determined that the current cardinality is below a threshold and the first hash value does not exist in the set of unique hash values, then:
    adding the first hash value to the set of unique hash values, and incrementing the current cardinality;
    transforming a second value of the data stream of values from the data set into a second hash value;
    determining whether the current cardinality exceeds the threshold;
    in response to determining that the current cardinality exceeds the threshold:
    identifying, based on a first portion of the second hash value, a particular memory location among a plurality of memory locations, each of which stores a particular count, and
    based on a second portion of the second hash value, determining whether to increase the particular count at the particular memory location; and
    based on respective counts at the plurality of memory locations, calculating an estimated cardinality of unique values in the data set without having to determine the exact number of unique values in the data set;
    wherein the method is performed by one or more computing devices.

11. The method of claim 10, further comprising:
    in response to determining that the current cardinality exceeds the threshold, for each hash value in the set of unique hash values:

identifying, based on a first portion of said each hash value, a corresponding memory location among the plurality of memory locations, and based on a second portion of said each hash value, increasing particular a respective count stored at the corresponding memory location.

12. The method of claim 10, further comprising:

receiving a request for a number of unique values in the data set;

determining whether the estimated cardinality is within a particular range; and if it is determined that the estimated cardinality is within the particular range, then:

using the estimated cardinality as a lookup value into a plurality of mapped values corresponding to the particular range, identifying a first mapped value from the plurality of mapped values that is less than the estimated cardinality, and identifying, from the plurality of mapped values, a second mapped value that is greater than the estimated cardinality, wherein the plurality of mapped values corresponds to the particular range, and based on the first mapped value, the second mapped value, and the estimated cardinality, recalculating the estimated cardinality.

13. A system comprising:

a value transformer that is configured to transform values from a data set into hash values;

a sketch generator that is configured to receive the hash values and generate a sketch based on the hash values; and a cardinality estimator that is configured to:

receive a request for a number of unique values within the data set;

calculate a first estimated cardinality of unique values in the data set by evaluating one or more values in the data set;

determine whether the first estimated cardinality is within a particular range;

in response to a determination that the first estimated cardinality is within the particular range, then:

using the first estimated cardinality as a lookup value into a plurality of mapped values corresponding to the particular range, identify, from the plurality of mapped values, a first mapped value that corresponds to the first estimated cardinality, and based on the first mapped value and the first estimated cardinality, calculate a second estimated cardinality of unique values in the data set; and identify the second estimated cardinality as a response to the request for the number of unique values in the data set without having to determine the exact number of unique values in the data set.

14. The system of claim 13, further configured to:

calculate the second estimated cardinality is based on the first mapped value, the first estimated cardinality, and a second mapped value from the plurality of mapped values;

wherein the first mapped value is less than the first estimated cardinality and the second mapped value is greater than the first estimated cardinality.

15. The system of claim 14, wherein each value in the plurality of mapped values corresponds to an exponential value in a plurality of exponentially related values.

16. The system of claim 15, further configured to:

calculate the second estimated cardinality is based on the first mapped value, the second mapped value, the first estimated cardinality, a first exponential value, and a second exponential value;

wherein the first exponential value is from the plurality of exponentially related values and corresponds to the first mapped value, and wherein the second exponential value is from the plurality of exponentially related values and corresponds to the second mapped value.

17. The system of claim 16, wherein a calculation of the second estimated cardinality is based on a linear regression.

18. The system of claim 13, wherein the particular range corresponds to a number of memory locations in a plurality of memory locations.

19. The system of claim 18, further comprising:

a store selector that is configured to:

receive a hash value;

determine a hash value count that indicates a number of unique hash values that have been generated based on a subset of the data set; and add the hash value to a set of unique hash values, if it is determined that the hash value count is below a threshold and the hash value does not exist in the set of unique hash values.

20. The system of claim 19, wherein:

the store selector is further configured to:

select each hash value from the set of unique hash values if it is determined that the hash value count exceeds the threshold, wherein each hash value comprises a first portion and a second portion; and the sketch generator that is configured to:

receive the set of unique hash values, for each hash value in the set of unique hash values:

identify, based on a first portion of said each hash value, a particular memory location among the plurality of memory locations, each of which stores a particular count, and based on second portion of said each hash value, determine whether to increase the particular count at the particular memory location.

21. The system of claim 20, wherein the first estimated cardinality is based on each particular count stored in the plurality of memory locations.

22. The system of claim 19, wherein the hash value comprises a first portion and a second portion, further comprising:

the sketch generator that is configured to, if it is determined that the hash value count exceeds the threshold, then:

identify, based on the first portion, a particular memory location among the plurality of memory locations, each of which stores a particular count, and based on the second portion, increase the particular count at the particular memory location.

23. A system comprising:

a value transformer that is configured to:

receive a data stream of values from a data set to estimate a cardinality of unique values in the data set transform a value from the data stream of values into a hash value;

a store selector that is configured to:

receive the hash value, determine a current cardinality of unique values for values received from the data set by determining a count of unique hash values in a set of unique hash values generated by transforming data set values from the data stream to hash values;

if it is determined that the current cardinality is less than a threshold and the hash value does not exist in the set of unique hash values:
add the hash value to the set of unique hash values, and increment the current cardinality;

a sketch generator that is configured to, for each hash value in the set of unique hash values, if it is determined that the current cardinality is not less than the threshold:
identify, based on a first portion of said each hash value, a particular memory location among a plurality of memory locations, each of which stores a respective count, and
based on a second portion of said each hash value, determine whether to increase the respective count at the particular memory; and a cardinality estimator that is configured to calculate an estimated cardinality of unique values in the data set based on respective counts at the plurality of memory locations without having to determine the exact number of unique values in the data set.

24. The system of claim 23, further comprising:

the cardinality estimator that is configured to:
receive a request for a number of unique values the data set;
determine whether the estimated cardinality is within a particular range; and
in response to a determination that the estimated cardinality is within the particular range:
using the estimated cardinality as a lookup value into a plurality of mapped values corresponding to the particular range, identify a first mapped value from the plurality of mapped values that is less than the estimated cardinality, and identify, from the plurality of mapped values, a second mapped value that is greater than the estimated cardinality, wherein the plurality of mapped values corresponds to the particular range, and
based on the first mapped value, the second mapped value, and the estimated cardinality, re-calculate the estimated cardinality.

* * * * *